United States Patent [19]

Harper

[11] Patent Number: 4,787,797
[45] Date of Patent: Nov. 29, 1988

[54] APPARATUS FOR HANDLING AND UNWINDING ROUND BALES

[76] Inventor: Samuel P. Harper, Annamult, Stoneyford, Kilkenny, Ireland

[21] Appl. No.: 72,218

[22] Filed: Jul. 10, 1987

[51] Int. Cl.⁴ ............................................. A01D 87/12
[52] U.S. Cl. .............................. 414/24.6; 241/101.7; 414/501; 414/518
[58] Field of Search ................... 414/24.5, 24.6, 501, 414/518; 241/101 A, 101.7; 239/679

[56] References Cited

U.S. PATENT DOCUMENTS

| | | | |
|---|---|---|---|
| 3,656,638 | 4/1972 | Hutton et al. | 414/518 |
| 4,360,167 | 11/1982 | Beccalori et al. | 414/24.6 X |
| 4,448,361 | 5/1984 | Marcy | 241/101.7 |
| 4,630,986 | 12/1986 | Taylor | 414/24.6 |

FOREIGN PATENT DOCUMENTS

| | | |
|---|---|---|
| 0131549 | 1/1985 | European Pat. Off. |
| 8301175 | 4/1983 | PCT Int'l Appl. |
| 0147670 | 7/1985 | PCT Int'l Appl. |
| 2146306 | 4/1685 | United Kingdom . |
| 1187091 | 4/1970 | United Kingdom ............. 241/101.7 |
| 1548029 | 7/1979 | United Kingdom . |
| 2018715 | 10/1979 | United Kingdom . |
| 2048211 | 12/1980 | United Kingdom ............... 414/24.6 |
| 2122480 | 1/1984 | United Kingdom ........... 241/101 A |
| 2138389 | 10/1984 | United Kingdom . |
| 2153337 | 8/1985 | United Kingdom . |

OTHER PUBLICATIONS

U.K. Search Report, Feb. 4, 1986, #Appln. 860532.

*Primary Examiner*—Leslie J. Paperner
*Attorney, Agent, or Firm*—Ladas & Parry

[57] ABSTRACT

Apparatus for handling and unwinding round bales of loose fibrous material such as hay, silage and the like comprises a wheeled frame and a turntable mounted for rotation on the frame, the turntable being adapted to receive and retain a round bale such that a bale placed on the turntable may be unwound in a substantially upright position. The turntable may be pivotable from a generally horizontal bale transporting position to a generally vertical bale loading position and in the transporting position, the turntable may be tilted with respect to the frame, generally towards the point at which hay is to be unwound from the bale and dispensed from the turntable. The apparatus is particularly suited for use in narrow passages between animal houses.

20 Claims, 11 Drawing Sheets

APPARATUS FOR HANDLING AND UNWINDING ROUND BALES

FIELD OF THE INVENTION

The present invention relates to apparatus for use in handling "round bales" of hay, silage or the like.

BACKGROUND OF THE INVENTION

In recent years there has been an increase in the use of round bales of hay which comprise a large cylindrical bale approximately 5 ft. (1.44 m) in diameter and 4 ft. (1.15 m) high in which hay has been compacted and wound in a spiral fashion by the hay baler. The preference for round bales as opposed to the conventional smaller "block bales" is because of the ease with which hay can be harvested into a round bale and the increased resistance of the round bale to wetting by rain when placed on its curved side. However, the round bale has the disadvantage that it is more difficult to handle and it creates a significant amount of hay litter when unbound prior to feeding to farm animals. In particular, stud farms, which are frequently on show to prospective customers, have a need for improved round bale handling equipment which would decrease the amount of hay litter around the stable yard.

DESCRIPTION OF PRIOR ART

Hitherto, round bale handling devices have included a simple spike for picking up and transporting the bale, such as those disclosed in British Pat. No. 1548029 and British Patent Specifications Nos. 2146306A and 2018715A. British Patent Specifications Nos. 2138389A and 2153337A disclose bale handlers which have a spike revolvably mounted thereon, such that if the spike is revolved, a bale mounted on the spike can be unwound flat onto the ground. The disadvantage of such bale handlers is that they create a lot of hay litter and dust around the stable or farmyard which must subsequently be tidied up.

Conveyor-type bale handlers are also known, such as that disclosed in European Patent Specification No. 0131549A2, which comprises a cradle for holding the bale on its side which is equipped with conveyor belts which rotate the bale around its central axis. The unwound hay is fed out to either side of the handler through openings in the cradle and may be chopped prior to being fed out of the handler. The disadvantage with such a system is that the bale must be correctly orientated to allow unwinding to a particular side outlet.

SUMMARY OF THE INVENTION

The present invention seeks to provide an improved apparatus including tractor attachments for handling round bales of hay.

It is an object of the invention to provide an apparatus for unwinding hay from a bale in which the initial loading orientation of the bale i.e. The unwinding direction is unimportant. Generally, the direction in which the hay has been wound is not apparent until the twine holding the bale together has been cut, and at that stage if the bale has been loaded into a handling device in the wrong orientation it is difficult to unload and reload the bale. The invention also seeks to provide an apparatus which allows hay to be unwound simply and efficiently, either manually or mechanically and preferably without creating too much litter and dust.

According to the present invention there is provided apparatus for handling and unwinding round bales of loose fibrous material, which comprises a wheeled frame and a turntable mounted for rotation on the frame, the turntable being adapted to receive and retain a round bale such that a bale placed on the turntable may be unwound with its axis in a substantially upright position.

Advantageously, the turntable may be pivoted from a generally horizontal bale transporting position to a generally vertical bale loading position.

In the transporting position, the turntable may be tilted with respect to the frame, generally towards the point at which material is to be unwound from the bale and dispensed from the turntable. The turntable may be tilted at an angle of up to 10° to the frame. Preferably the turntable is tilted a 5° to the frame.

The apparatus may be adapted so that material is unwound from the bale and dispensed at the front of the apparatus, and that the turntable is tilted towards the front of the apparatus.

The apparatus may be provided with a dispensing unit which comprises a grasping means which directs the unwound material towards a dispensing means. Preferably, the dispensing unit also comprise a shredding means which shreds the material before it is dispensed. The grasping means may be movable towards the turntable, and may comprise a pair of pinch rollers.

The turntable may be manually or mechanically rotated and may be pivoted from the transporting to the loading position by means of a hydraulic ram.

The bale may be retained on the turntable by means of a spike extending from the turntable and/or a substantially vertical shield extending around the periphery of the turntable.

The apparatus is preferably provided with an annular rim extending around the circumference of the turntable which supports a substantially vertical shield to contain a round bale. The rim and shield are preferably adapted such that at least one section can be swung away from the turntable to allow the turntable to be pivoted from a transporting position to a loading position. The shield may have a door portion which may be lowered to the ground to form an unloading chute.

The forward portion of the shield and turntable are preferably made of a substantially transparent material, such as PERSPEX (Trade Mark) or expanded metal, to allow an operator to see the bales as they are being loaded.

DETAILED DESCRIPTION OF THE INVENTION

Figure 1:
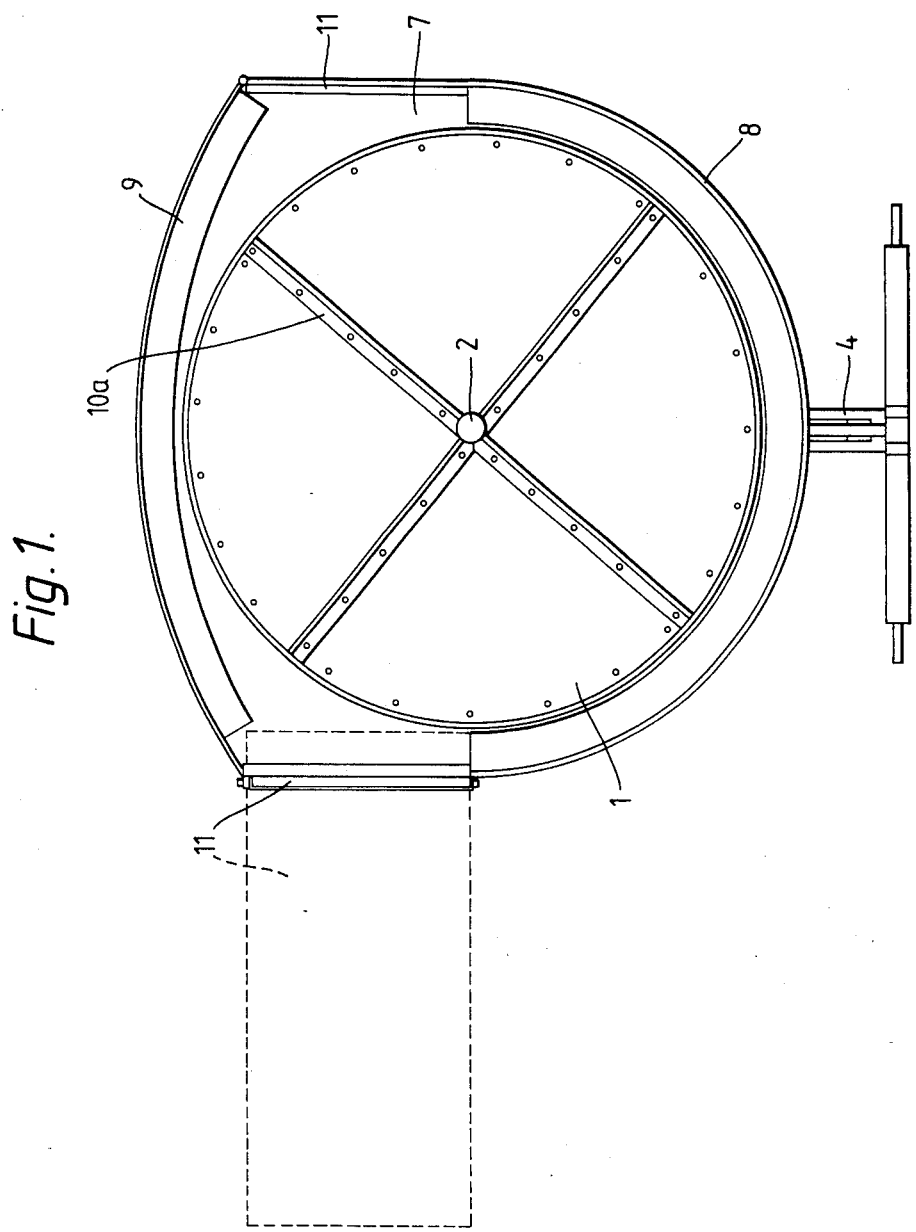
FIG. 1 is a plan view of a tractor attachment for handling round bales of hay in accordance with a first embodiment of the invention showing the turntable in the transporting position with the lowered position of one of the chutes shown in dashed outline.
Figure 2:
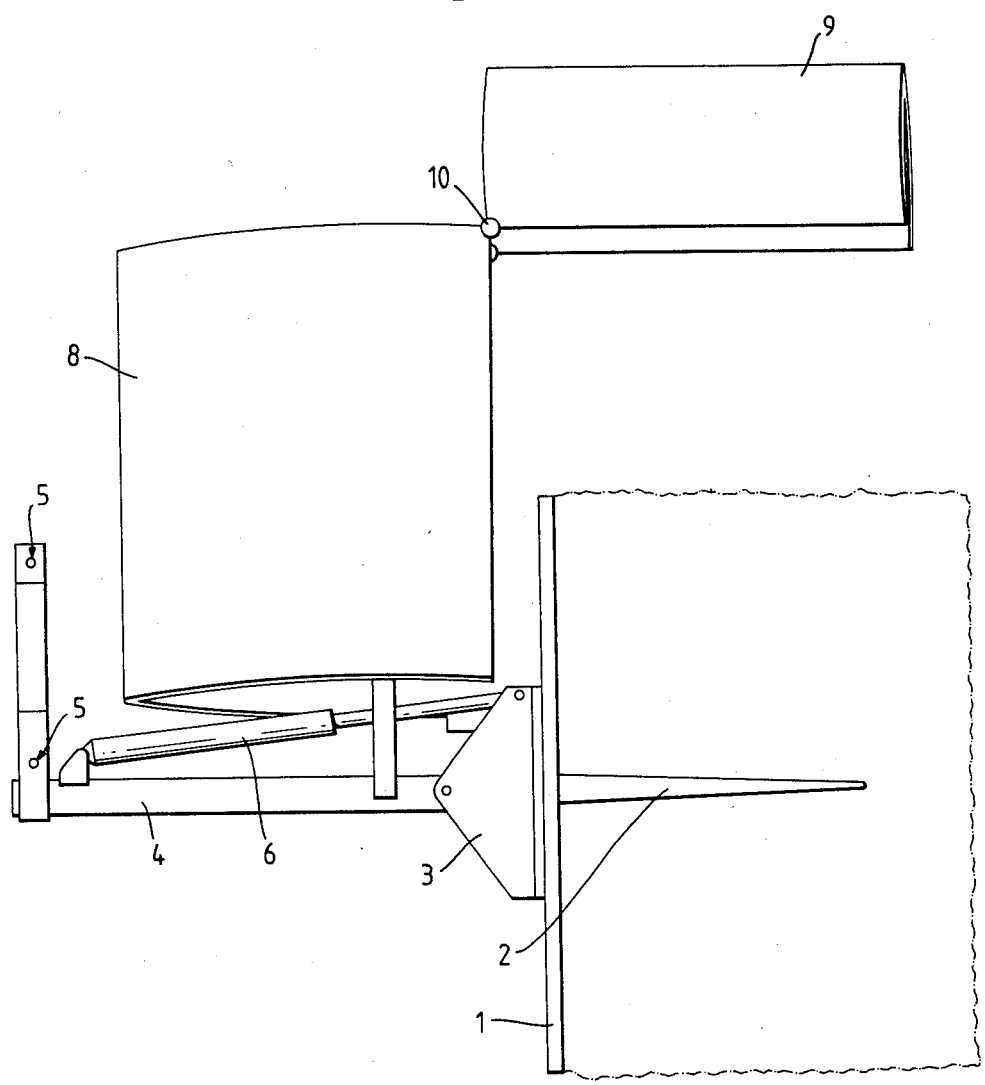
FIG. 2 is a side elevation of the tractor attachment for handling round bales of hay in accordance with a second embodiment of the invention showing the turntable in the loading position, with the position which would be occupied by a bale of hay being shown in dashed outline.

As shown in FIGS. 1 and 2 of the drawings, a tractor attachment for handling round bales of hay comprises a turntable 1 with a centrally located bale spike 2 extending from the turntable 1 along the turntable axis. The turntable 1 is mounted on a pivot arm 3 which is turn is mounted on a chassis frame 4. The frame 4 is provided with locations 5 for a three-point linkage to a tractor. An hydraulic ram 6, which pivots the turntable 1 about pivot arm 3, is located on frame 4.

The turntable 1 is surrounded by an annular rim 7 which supports a vertical shield 8. The rim 7 and shield 8 are built in two sections such that the rear section 9 may be pivoted so as to swing out to one side and away from the turntable 1 about pivot point 10, thereby allowing unhampered movement of turntable 1 during loading of the bale. In an alternative embodiment the rear section 9 may be pivoted so as to swing up over the top of the tractor attachment. The shield 8 has two door-like sections 11 one of which may be unfastened and lowered to the ground to form an unloading chute, depending upon which side hay is to be dispensed from. The frame is also provided with a second hydraulic ram (not shown) which can be used to tilt the turntable to either side. This embodiment has the advantage that a tractor can be driven along a narrow passageway with stables on both sides and hay can be unloaded on either side. It will be appreciated that hay may be unravelled from the bale by turning the bale on the turntable in a clockwise or anti-clockwise direction so that it does not matter which way up the bale has been loaded.

In this particular embodiment the turntable 1 and rim 7 are for example 6 ft (1.83 m) in diameter, which is wide enough to allow for expansion of the bale when it is untied, and the shield is for example 4 ft. (1.22 m) high.

The frame is made of angle irons and the shield is made of a flexible material. Angle irons 10 provide support for the turntable 1, and in the arrangement illustrated in FIG. 1 also provide a means for gripping the base of a round bale in use. However, angle irons 10 may be fixed to the underside of the turntable, with a smooth turntable top if desired.

In use, the rear section 9 of the shield 8 swings to one side and the turntable 1 is hydraulically tilted rearwardly into the vertical loading position. The tractor is then reversed such that a bale of hay lying on its curved side is speared by spike 2. The turntable 1 is then hydraulically tilted into the generally horizontal transporting position and the rear section 9 of the shield 8 is fastened again. The tractor then moves the attachment to a stable or other area where the hay is to be unloaded. The twine holding the hay bale together is then untied. An unloading chute 11 is lowered and as turntable 1 is rotated manually the hay is unwound and pulled out along the chute and into the stable. Chute 11 can then be raised and refastened, and the tractor moved to the next stable.

A second embodiment of the invention is illustrated in FIG. 2 which differs from the first embodiment in that only one chute 11 is provided and the turntable 1 is permanently tilted towards the chute side. The additional features of a second chute and second ram for tilting the turntable from side to side are therefore optional.

Figure 3:
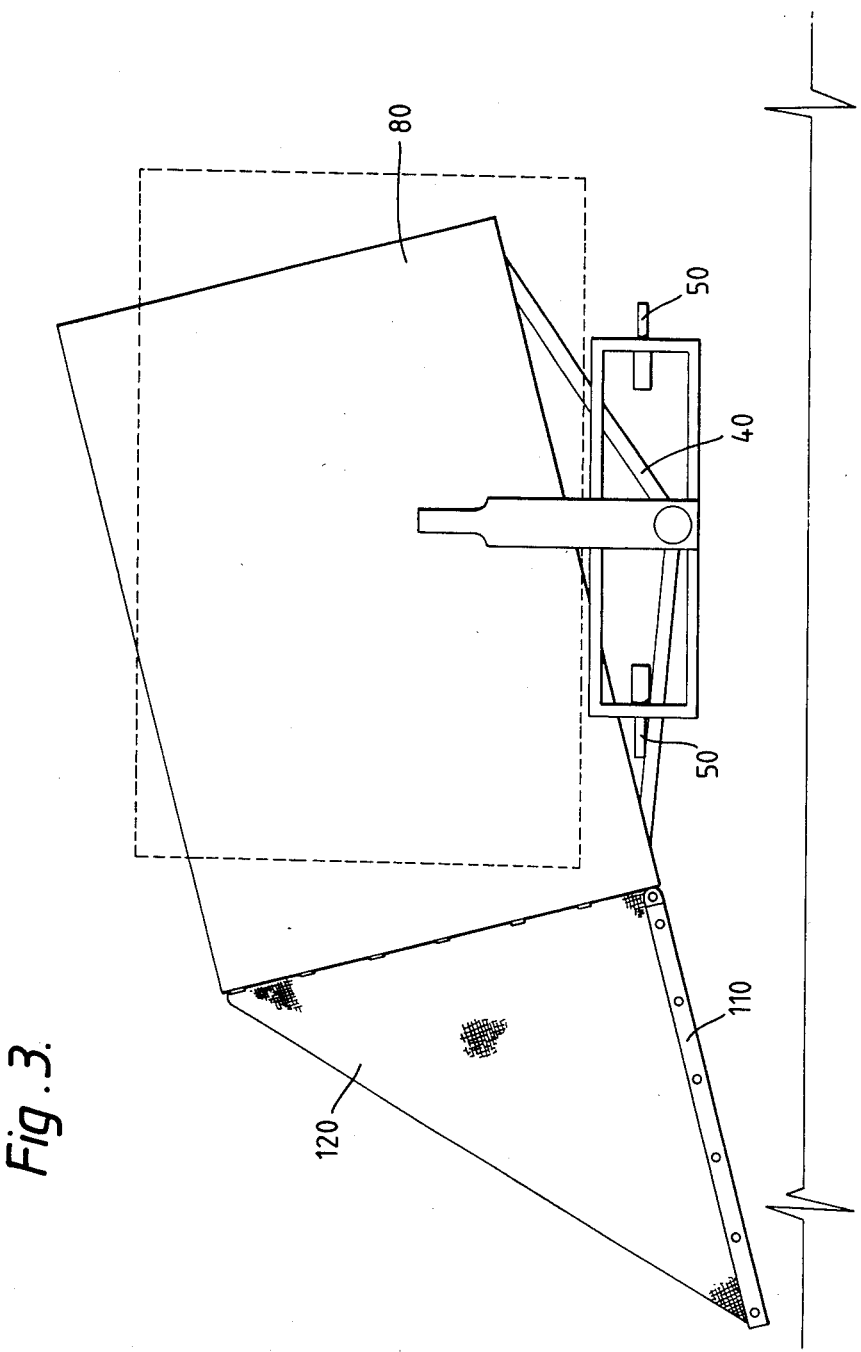
FIG. 3 is a front elevation of a trailer for handling round bales of hay in accordance with a third embodiment of the invention with one of the chutes lowered.

In another embodiment of the invention illustrated in FIG. 3 the chassis frame 40 is a rigid structure on which the turntable is mounted so as to tilt to one side, with a door or chute 110 being provided in shield 80 on that side which tilts towards ground level. The chute 110 is provided with canvas sides 120 to prevent hay litter from falling off the bale as it is unravelled. This embodiment may comprise a simple trailer which can be manually wheeled along a passageway or towed by a vehicle by means of linkage points 50. It may be loaded with a round bale by means of a front-end loader.

Alternatively, the wheeled trailer may have a shield formed from canvas or plastic sheeting and may be battery assisted.

Figure 4:
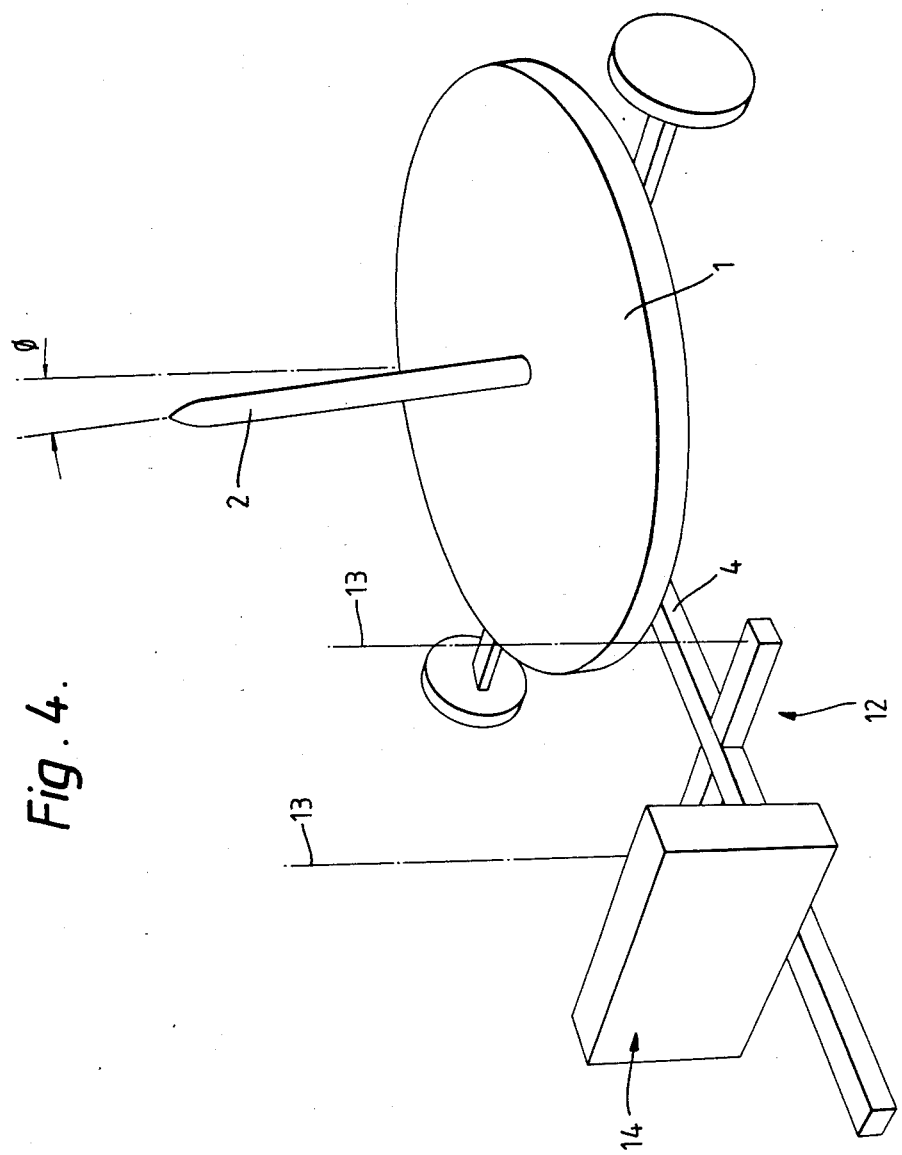
FIG. 4 is a schematic representation of a tractor attachment for handling round bales of hay diagramatically showing a turntable, a spike, a hay grasping means and a shredding/dispensing unit mounted on a frame.

As schematically shown in FIG. 4, the bale handling device of the invention may be adapted to mechanically dispense or shred the hay as it is unwound from the bale. A tractor attachment of this type may comprise a turntable 1 and a hay dispensing unit 12 which in turn comprises a hay feeding means 13 which grasps the hay as it is unwound from the bale and feeds it towards a hay dispensing/shredding means 14. The feeding means 13 and the dispensing/shredding means 14 may be mounted on the chassis frame 4 towards the front of the bale handling device. In such a tractor attachment the turntable 1 may be permanently tilted towards the point at which hay is unwound from the bale. In this figure the turntable is tilted towards the hay dispensing unit 12 at an angle $\phi$ to the horizontal, thus utilizing gravity to assist the hay to fall away from the remainder of the bale as it is unwound. In practice, the angle $\phi$ may be up to 10°, but is preferably 5°.

Figure 5:
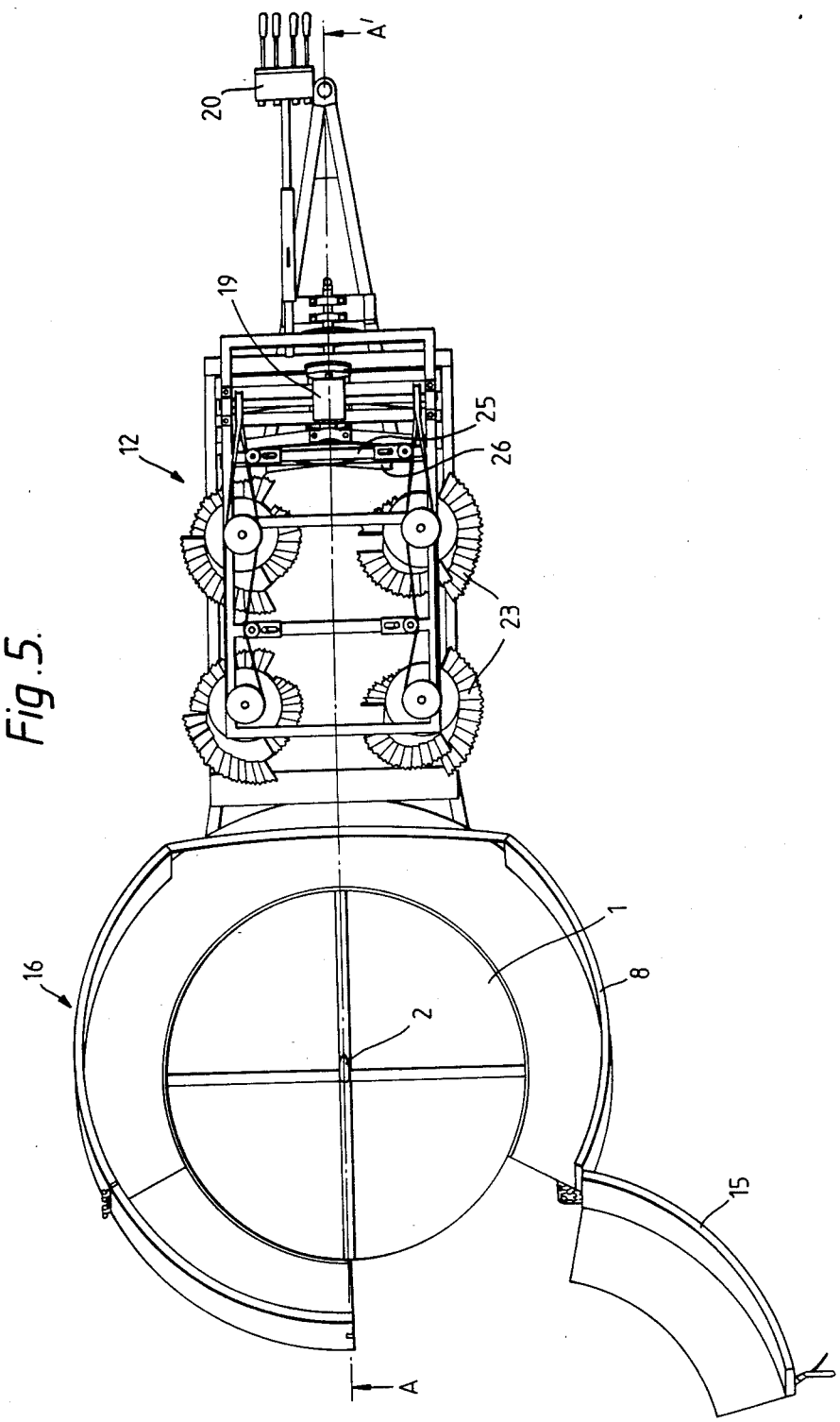
FIG. 5 is a plan view of a tractor attachment for handling round bales of hay in accordance with a fourth embodiment of the invention, having a hay dispensing unit with two hay grasping rollers.
Figure 6:
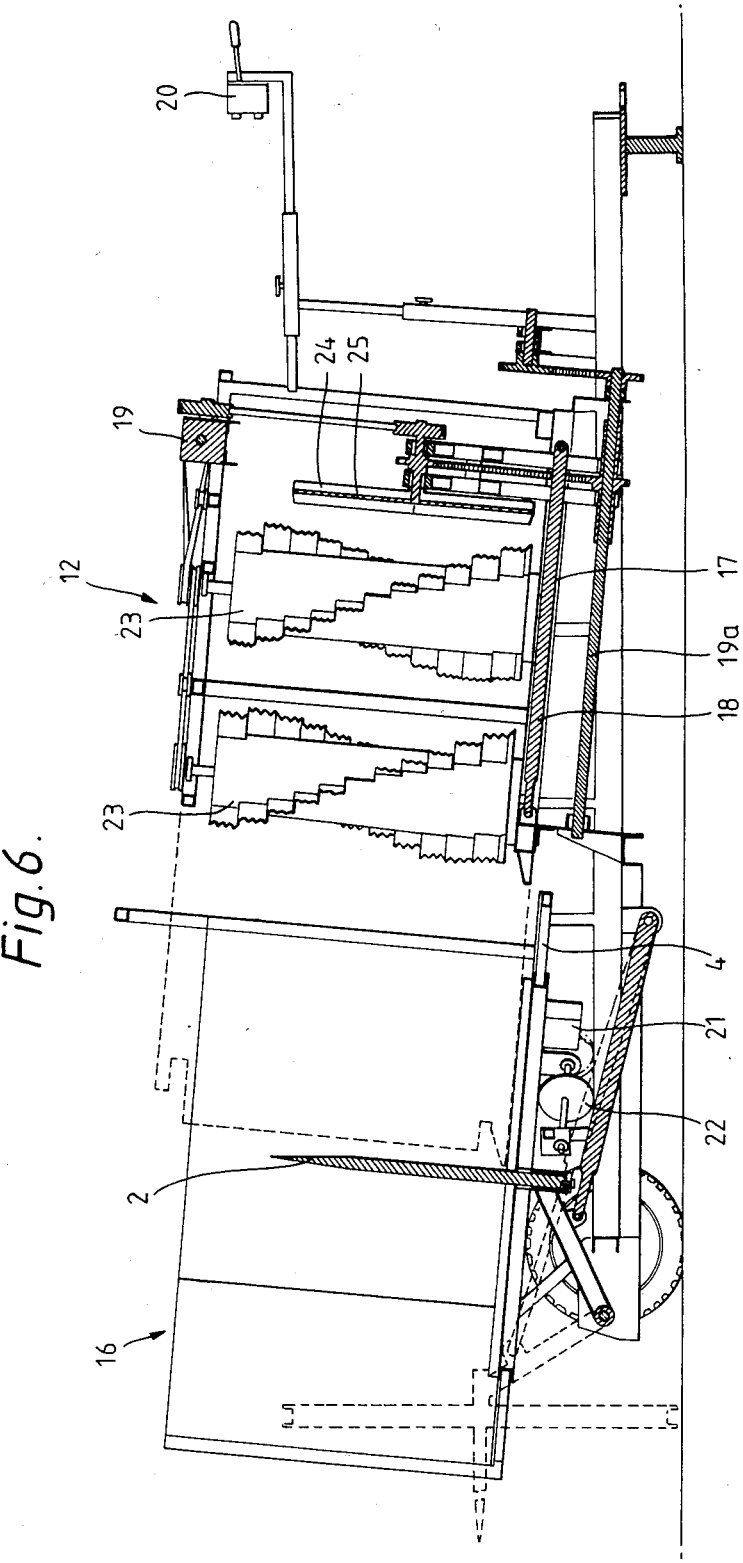
FIG. 6 is a cross-section of the tractor attachment when viewed along the line A—A' in FIG. 5.
Figure 7:
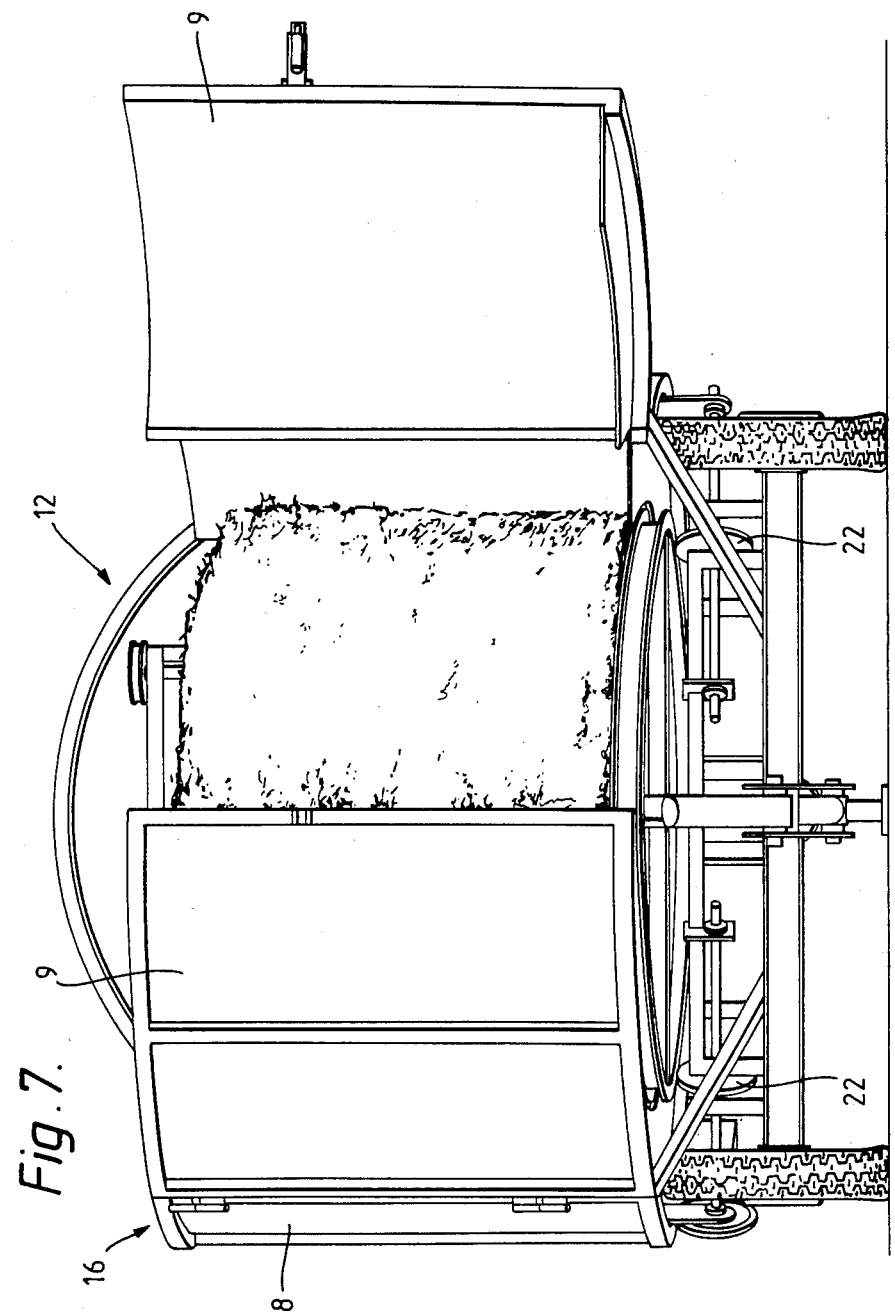
FIG. 7 is a rear elevation of the tractor attachment of FIG. 5.

A fourth embodiment of the invention, which is adapted to mechanically dispense hay, is illustrated in FIGS. 5 to 7. This attachment comprises a forwardly tilted turntable 1, a spike 2, a shield 8, the rear portion 9 of which forms two doors 15. Together, the turntable 1 and shield 8 form a bale chamber 16. The attachment additionally has a hay dispensing unit 12 mounted on a dispensing chassis 17 which is separate from the chassis frame 4 upon which the turntable 1 is mounted. The dispensing chassis 17 is mounted on a slide 18 which enables the dispensing chassis 17 to slide rearwardly into the bale chamber 16 until it almost reaches the spike 2. The dispensing unit 12 is therefore able to move rearwardly into the bale chamber 16 as hay is unwound from the bale and the size of the bale decreases. The sliding movement of the dispensing chassis 17 is operated by a hydraulic ram 18 and is controlled by the tractor-operator by means of a switch unit 20.

The turntable 1 is mechanically rotated by means of an hydraulic drive motor 21 and a pair of drive wheels 22. The turntable 1 is tilted with respect to the frame 4 at an angle of 5°. This arrangement therefore uses the force of gravity to assist the layer of straw being unwound to fall away from the remainder of the bale.

The hay dispensing unit 12 comprises two pairs of laterally-opposed, toothed feed rollers 23 driven by a power take-off from the tractor via gear-box 19 and shaft 19a. These rollers 23 grasp a layer of the hay as it is unwound from the bale and feed it towards a centrifugal discharge assembly 24 which comprises a fly-wheel 25 which has a plurality of paddles 26 which break up the hay before it is dispensed through an opening in the side of the dispensing unit 12.

Figure 8:
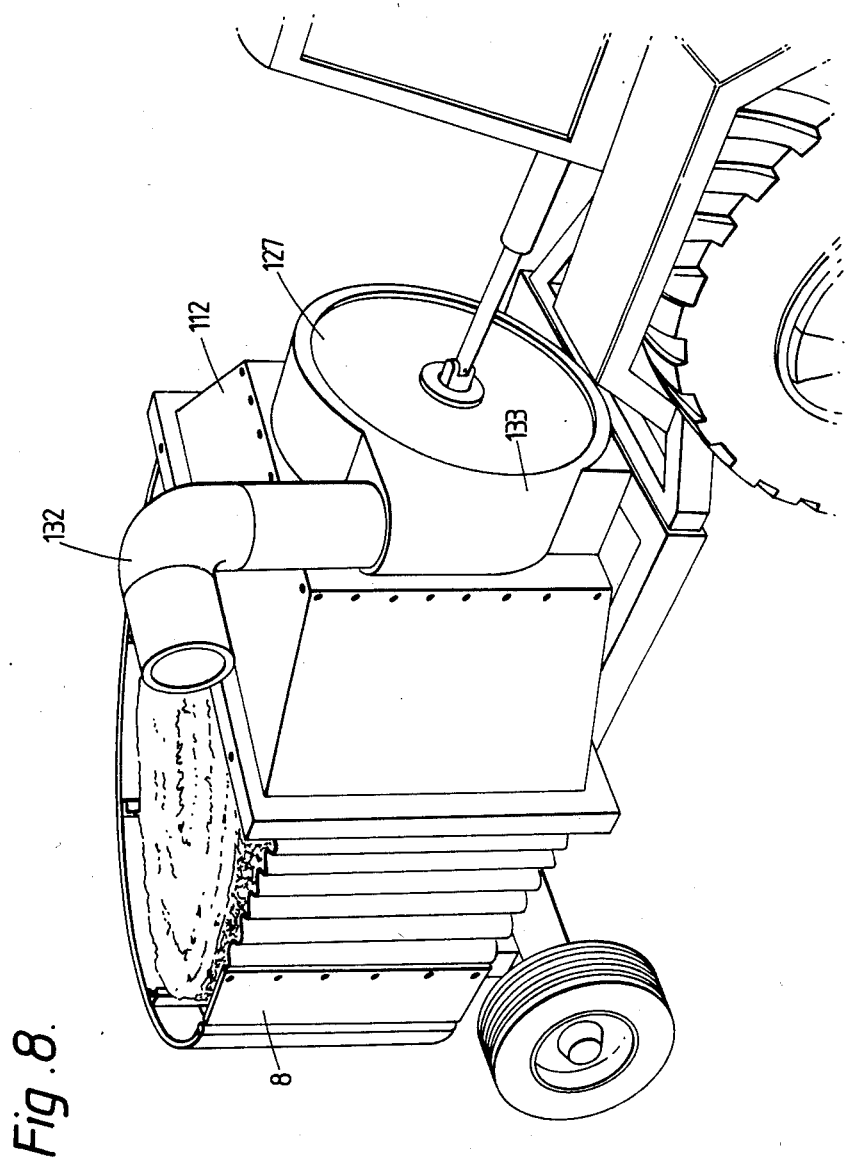
FIG. 8 is a three dimensional view of a tractor attachment for handling round bales of hay in accordance with a fifth embodiment of the invention having a hay shredding unit.
Figure 9:
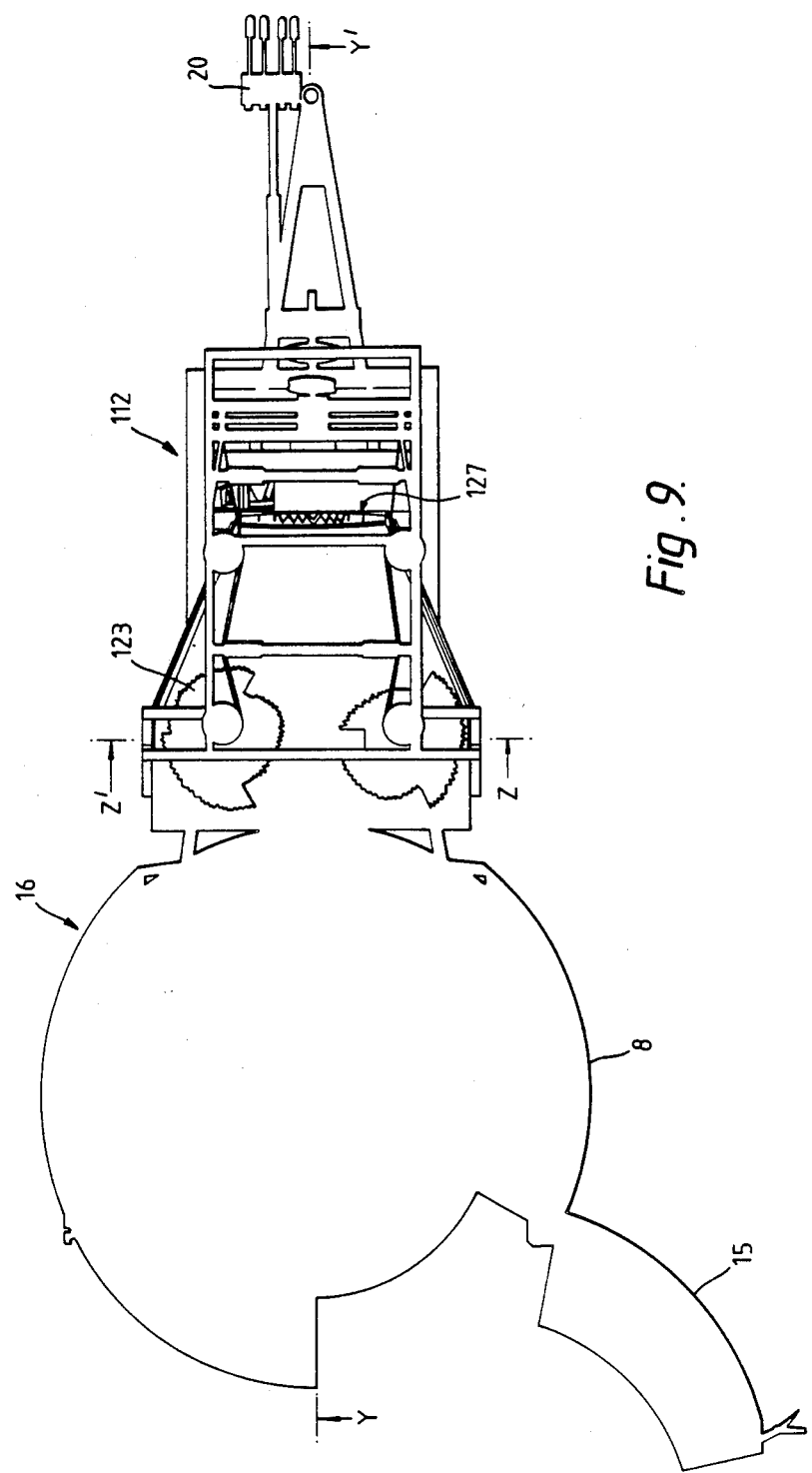
FIG. 9 is a plan view of the tractor attachment of FIG. 8.
Figure 10:
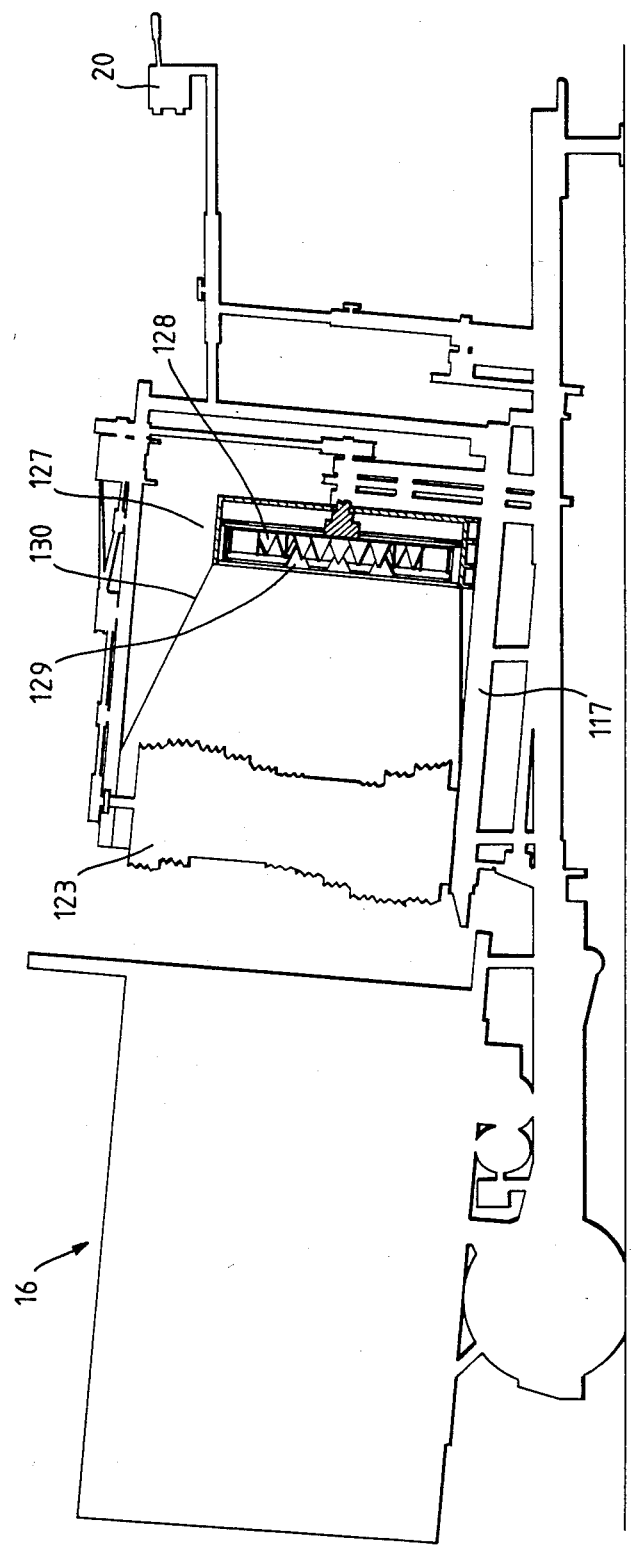
FIG. 10 is a cross-section of the tractor attachment when viewed along the line Y—Y' in FIG. 9.
Figure 11:
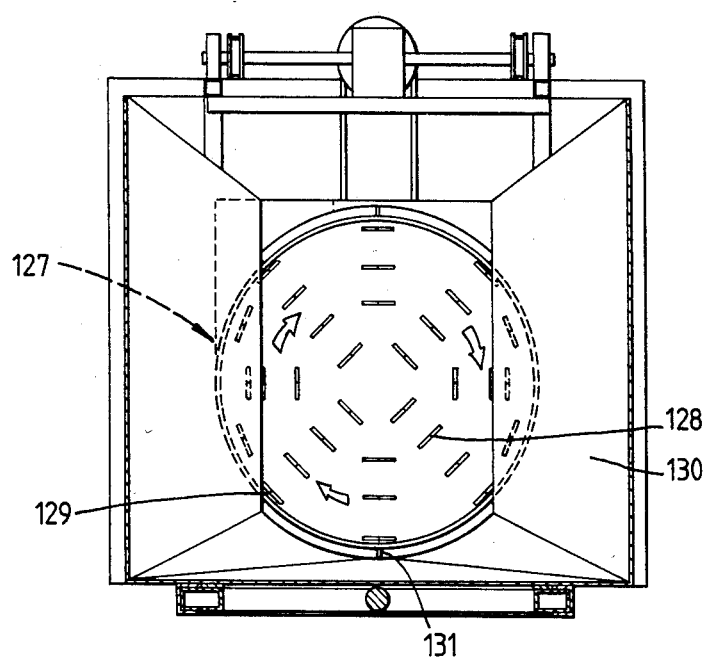
FIG. 11 is a cross-section of the tractor attachment when viewed along the line Z—Z' in FIG. 9.

A fifth embodiment of the invention is illustrated in FIGS. 8 to 10. This embodiment also has a hay dispensing unit 112 mounted on a sliding dispensing chassis 117. The hay dispensing 112 unit comprises a single pair of laterally-opposed, toothed feed rollers 123 which feed the hay towards a shredding unit 127. The shredding unit 127, which is shown in greater detail in FIG. 11 has a plurality of rotary cutting blades 128 and a plurality of fixed blades 129 which are pitch staggered relative to the rotary cutting blades 128. The hay dispensing unit 112 also has a shield 130 which guides a layer of hay between the feed rollers 123 and the shredding unit 127. Once the hay is shredded a plurality of feed paddles 131 toss the hay into an outlet chute 132 through which it is blown out of the attachment by an air blower 133.

It will be appreciated that some of the drawings do not show wheels for clarity, but that the apparatus of the invention is adapted for mobility, and embodiments comprising hydraulically operated components are especially adapted as farm tractor attachments.

The bale handling and unwinding apparatus as described above may be suitably adapted to handle round silage bales.

The bale handling and unwinding apparatus may also be adapted as a self-propelled vehicle which additionally includes a hopper unit, located between the bale unwinding unit as described above and a driver's cab, for use in cleaning out stables and the like.

I claim:

1. Apparatus for handling and unwinding a round bale of loose fibrous material, comprising
   a wheeled frame,
   a turntable adapted to receive and retain a round bale thereon, mounted for rotation on the frame, such that a bale placed on the turntable may unwound with its axis in a substantially upright position, and
   means to contain a bale upon the turntable, extending from the frame around the periphery of the turntable, having at least one openable sidewall section adapted to permit loose fibrous material unwound from the bale to be dispensed there-through and directed to one side of the apparatus.

2. Apparatus as claimed in claim 1 wherein the turntable is pivotable from a generally horizontal bale transporting position to a generally vertical bale loading position.

3. Apparatus as claimed in claim 2 wherein the transporting position, the turnable is tilted with respect to the frame, generally towards the side at which loose fibrous material is to be unwound from the bale and dispensed from the turntable.

4. Apparatus as claimed in claim 3 wherein the turntable is tilted at an angle of up to about 10° to the frame.

5. Apparatus as claimed in claim 3 wherein the apparatus is adapted so that loose fibrous material may be unwound from the bale and dispensed towards the front of the apparatus, and wherein the turntable is tilted towards the front of the apparatus.

6. Apparatus as claimed in claim 1 wherein the bale may be retained on the turntable by means of a spike extending from the turntable and by upstanding radially-disposed ribs thereon.

7. Apparatus as claimed in claim 1 wherein the bale-containing means comprises a shield defining a door portion which may be lowered to the ground to provide an unloading chute.

8. Apparatus as claimed in claim 1 wherein the forward portion of the bale-containing means is made of substantially transparent material.

9. Apparatus for handling and unwinding a round bale of loose fibrous material, comprising
   a wheeled frame,
   a turntable adapted to receive and retain a round bale thereon, mounted for rotation on the frame such that a bale placed on the turntable may be unwound with its axis in a substantially upright position.
   a shield to contain a bale upon the turntable, extending from the frame around the periphery of the turntable, and opening to the front of the turntable,
   grasping means located adjacent to and in front of the turntable and movable towards the turntable adapted so as to pull unwound material from the bale to be dispensed, and
   dispensing means located adjacent to the grasping means so as to direct material to be dispensed to one side of the apparatus.

10. Apparatus as claimed in claim 9 comprising
    shredding means located between the grasping means and the dispensing means to shred the material before it is dispensed from the apparatus.

11. Apparatus as claimed in claim 9 wherein the grasping means comprises a pair of pinch rollers.

12. Apparatus for handling and unwinding a round bale of fibrous material, comprising
    a wheeled frame,
    a turntable adapted to receive a round bale thereon with its axis substantially normal thereto, mounted for rotation on the frame,
    bale-retaining means projecting from the turntable so as to retain a round bale thereon for handling and unwinding purposes,
    means to pivot the turntable with respect to the frame from a generally horizontal bale-transporting position to a generally vertical and rearward-facing bale-loading position, and
    shield means to confine bale litter on board the apparatus during bale-unwinding operations, comprising an upstanding structure fixed to the frame, extending around the periphery of the turntable, adapted so as to permit the turntable pivoting means to move the turntable from the said bale-transporting position to the said bale-loading position without fouling the rearwardly-facing portion of the shield means.

13. Apparatus as claimed in claim 12 wherein in the bale-transporting position the turntable is tiltable with respect to the frame, generally towards a side at which loose fibrous material is to be unwound from the bale and dispensed from the turntable.

14. Apparatus as claimed in claim 13 wherein the turntable is tiltable at an angle of up to about 10° to the frame.

15. Apparatus as claimed in claim 13 adapted so that loose fibrous material may be unwound from the bale and dispensed towards the front of the apparatus, and wherein the turntable is tilted towards the front of the apparatus, when at rest in a bale-transporting position.

16. Apparatus as claimed in claim 12 wherein the bale-retaining means comprises a spike extending from the turntable, and upstanding radially-disposed ribs thereon.

17. Apparatus as claimed in claim 12 wherein the shield means defines a door portion which may be lowered to the ground to provide an unloading chute.

18. Apparatus as claimed in claim 12, wherein the shield means is adapted such that the rearwardly-facing portion thereof can be swung away from the turntable to allow the turntable to be pivoted from the said bale-transporting position to the said bale-loading position.

19. Apparatus as claimed in claim 18 wherein at least the forwardly-facing portion of the shield means is made of substantially transparent material 20. Apparatus as claimed in claim 18 wherein the turntable is made of a substantially transparent material.

* * * * *